United States Patent [19]
Flammer, III

[11] Patent Number: 5,400,338
[45] Date of Patent: Mar. 21, 1995

[54] PARASITIC ADOPTION OF COORDINATE-BASED ADDRESSING BY ROAMING NODE

[75] Inventor: George H. Flammer, III, Cupertino, Calif.

[73] Assignee: Metricom, Inc., Los Gatos, Calif.

[21] Appl. No.: 193,337

[22] Filed: Feb. 8, 1994

[51] Int. Cl.$^6$ .................. H04L 12/56; H04Q 7/00
[52] U.S. Cl. .................. 370/94.1; 379/60; 455/33.2; 455/56.1
[58] Field of Search .................. 370/60, 60.1, 94.1, 370/94.2, 94.3, 95.1, 95.3, 54; 379/58, 57, 220, 211, 59, 60; 455/33.1, 54.1, 56.1; 340/825.52, 825.53

[56] References Cited

U.S. PATENT DOCUMENTS

| | | | |
|---|---|---|---|
| 4,658,416 | 4/1987 | Tanaka | 379/57 |
| 4,939,726 | 7/1990 | Baran et al. | 370/94.1 |
| 4,999,833 | 3/1991 | Lee | 370/94.3 |
| 5,197,092 | 3/1993 | Bamburak | 379/59 |
| 5,325,362 | 6/1994 | Aziz | 370/94.3 |

Primary Examiner—Douglas W. Olms
Assistant Examiner—Hassan Kizou
Attorney, Agent, or Firm—Townsend and Townsend Khourie and Crew

[57] ABSTRACT

In a packet communication system wherein stationary nodes are assigned an absolute coordinate-based address, the addressing of roaming nodes is accomplished by parasitically adopting a coordinate routing scheme used for addressing stationary nodes. Each roaming node selects a parent stationary node with which the roaming node can communicate directly. During the course of network operation, the roaming node may select a new parent node. At the time of reassignment, the coordinates of the new parent node, along with the identity of the roaming node, is recorded at the former parent node. Forwarding of packets to stationary nodes is accomplished according to a known coordinate-based routing scheme. A packet addressed to a destination roaming node is forwarded and directed through the then current stationary parent node. The packet is then forwarded to the destination roaming node.

6 Claims, 3 Drawing Sheets

Microfiche Appendix Included
(1 Microfiche, 19 Pages)

PARASITIC ADOPTION OF COORDINATE-BASED ADDRESSING BY ROAMING NODE

A microfiche appendix including 19 frames on one fiche is included herewith.

BACKGROUND OF THE INVENTION

The invention relates generally to a method for routing data packets through a packet communication network and more specifically to a method for routing data packets in a network where some nodes can roam during network operation.

Packet communication is a form of data communication whereby segments or packets of data are routed with error checking and confirmation of receipt. Packets may be transmitted directly between a source and destination or relayed via relay stations. Several methods of data packet routing are known.

One method is known as directory-based routing. According to this method the address in the header of a packet is used as an index to a directory of packet routing lists stored in a transmitting or source node. A packet routing list consists of an ordered list of packet node identifiers or call signs that represent a transmission path from the transmitting node to the destination. Packet routing lists must be prepared with knowledge about the location of each node in the network. Directory-based routing schemes require continued maintenance and communication of network interconnection information employed in the directory. Each of these functions drains network resources and this can severely reduce performance in a large network. However, directory-based routing techniques have the advantage of permitting optimization of routing for a wide variety of network parameters, including data delay, throughput, reliability, priority and the like.

Another basic routing technique is the non-directory-based routing technique. In non-directory-based routing, the complexities associated with directory-based routing techniques are avoided. There is no need to store connectivity information for each transmitting node in the network thus reducing the amount of overhead processing that must be done by the network to preserve network connections. However, non-directory-based routing techniques generally do not permit network parameter optimization.

In U.S. Pat. No. 4,939,726, issued to Baran et al. and assigned to the assignee of the present invention, a non-directory-based routing method and system that permit network parameter optimization are disclosed. According to the method described therein, each stationary node in a network is uniquely identified by absolute geographical coordinates or by a code indicating absolute location in an external coordinate-based reference system (node coordinates), and such absolute geographical coordinates or the equivalent are employed as part of a packet identifier for each packet. A means at each node through which a packet is routed uses the packet destination coordinates and the node coordinates its neighboring nodes to determine a desired forwarding route of a data packet. The routing may be prioritized according to preselected criteria, preferably achieving optimum forward progress, that is, maximum forward progress using the least amount of power and taking into account characteristics of the system.

Accordingly, the disclosed packet routing method requires no routing directory or table to perform data routing. Each stationary node of the network collects or is otherwise provided with information about the quality of communication between itself and the nodes within the stationary node's communication range. When a data packet has been received at a node, the data packet is routed further through the network based on criteria derived from the history of communication between the local node and its neighbors. The criteria include distance, power requirements, retry history (reliability), throughput history, speed of transfer (net data rate), network delay, and data priority. Typically, there is an initialization procedure which is executed to determine the latitude and longitude of neighbors within a destination quadrant, and the criteria are weighted in accordance with preselected preferences to establish, at each subject node, a link quality (LQ) factor for each possible destination local to the subject node.

A packet in the Baran network is organized with four layers of header information as follows:

| L1H | L2H | L3H | L4H | data | L1T | where:
L indicates "layer";
H indicates "header";
T indicates "tailer."

The Layer 1 header is responsible for transferring data in a packet in error-free form and includes a checksum value for comparing accuracy of packet transmission.

The Layer 2 header comprises the local destination address, the local or circuit source address, a pro-type field (packet protocol and type) and a frame identification. The destination address is the geographic coordinates of the next local destination and the source address is the geographic coordinates of the local node. The destination address of a received packet becomes the source address of the same packet on its retransmission, and the destination address for retransmission is selected by the local node based on analysis of the metrics used to establish optimum forward progress. The Layer 2 local destination is not the ultimate destination of the packet. The ultimate destination address is contained in a Layer 3 header, which is used for routing a packet between any source and any destination within a wide area net or between wide area nets.

The Layer 3 header is examined upon receipt of a packet at any node to determine if the wide-area-network destination address (WANDA) in the header corresponds to the WANDA of the node. If the WANDAs are not identical, the node forwards the packet to a next hop in the network. Several routing protocols may be used.

The LAN Destination Address is the identifier of the exact device within the LAN. The LAN Source Address is the device identifier of the originating device. The LAN Source Address is used by the destination device for formatting a response packet. Routing a response back to the source merely involves swapping the LAN Destination Address for the LAN Source Address, assuming the Layer 3 header has been properly rebuilt for the return.

Each device in the network thus has a primary address, namely, the WAN Address, and a secondary address, namely, the LAN Address. The WAN address is the unique latitude and longitude designation of each repeater node, within one second (20 meters) of geographic accuracy. All devices within the LAN of the repeater node use the WAN Address of the repeater node as their WAN Address.

The coordinate-based addressing method described above provides a satisfactory solution to the problem of non-directory routing in a network consisting entirely of stationary nodes. However, many networks further comprise mobile or roaming nodes. Such nodes cannot be assigned the absolute geographic coordinates required by the geographical addressing method.

One method that has been employed in prior art networks designed for use with roaming nodes, such as cellular telephone systems, is for the stationary nodes in the system to continuously keep track of and in touch with each roaming node and to "hand off" roaming nodes from one stationary node to another. Such a system requires tremendous processing and communication overhead to take place within and between each stationary node and is contrary to the reduced processing desired in a non-directory-based system. Such an approach is particularly inefficient when a roaming node does not continuously transmit data, but instead transmits packets infrequently and at unpredictable times.

What is needed is a routing method that permits roaming nodes to be addressed in a network in which stationary nodes are addressed using a coordinate-based addressing method and that does not require excessive processing by the network or the stationary nodes in the network to maintain contact with the roaming nodes.

SUMMARY OF THE INVENTION

According to the invention, in a packet communication system wherein stationary nodes are assigned an absolute coordinate-based address, the addressing of roaming nodes is accomplished by parasitically adopting the coordinate-based routing scheme used for addressing stationary nodes. Each roaming node initially selects a parent stationary node with which the roaming node can communicate directly. The coordinates of this parent stationary node are used in the header block of each packet transmitted from the roaming node and these coordinates are seen by all receiving nodes and then used in subsequent transmissions back to the roaming node. During the course of network operation, the roaming node will select a new parent node when the roaming node is no longer within direct communication range from the current parent node or for other reasons, such as addition or deletion of nodes. When a new parent is selected, the coordinates of the new parent node, along with the identity of the roaming node, are recorded at the former parent node. In one embodiment of the invention, a roaming node may, in addition to selecting a single parent node, maintain a list of alternate stationary nodes with which it can communicate when the parent node is unavailable.

In accordance with the method according to the invention, once a roaming node has moved from the range of its initial parent node, a packet addressed to that roaming node at its old parent node address is forwarded through a chain of stationary parent nodes beginning with the address of the old parent node and culminating in the current parent node. Upon receipt of a packet addressed to a parent node for a roaming node, each parent node determines whether it is the current parent node for the addressed roaming node. If the node is the current parent node, the packet is forwarded directly to the destination roaming node. If the node is not the current parent node, the node forwards the packet to the immediate successor parent node using the previously recorded coordinates of the immediate successor parent node.

In one embodiment of the invention, the network also includes a "name server" to which the roaming node periodically transmits its location. Nodes wishing to send to the roaming node may query the name server to get the most recently transmitted location of the roaming node.

The invention will be better understood by reference to the following detailed description in connection with the accompanying drawings.

DETAILED DESCRIPTION OF SPECIFIC EMBODIMENTS

Figure 1:
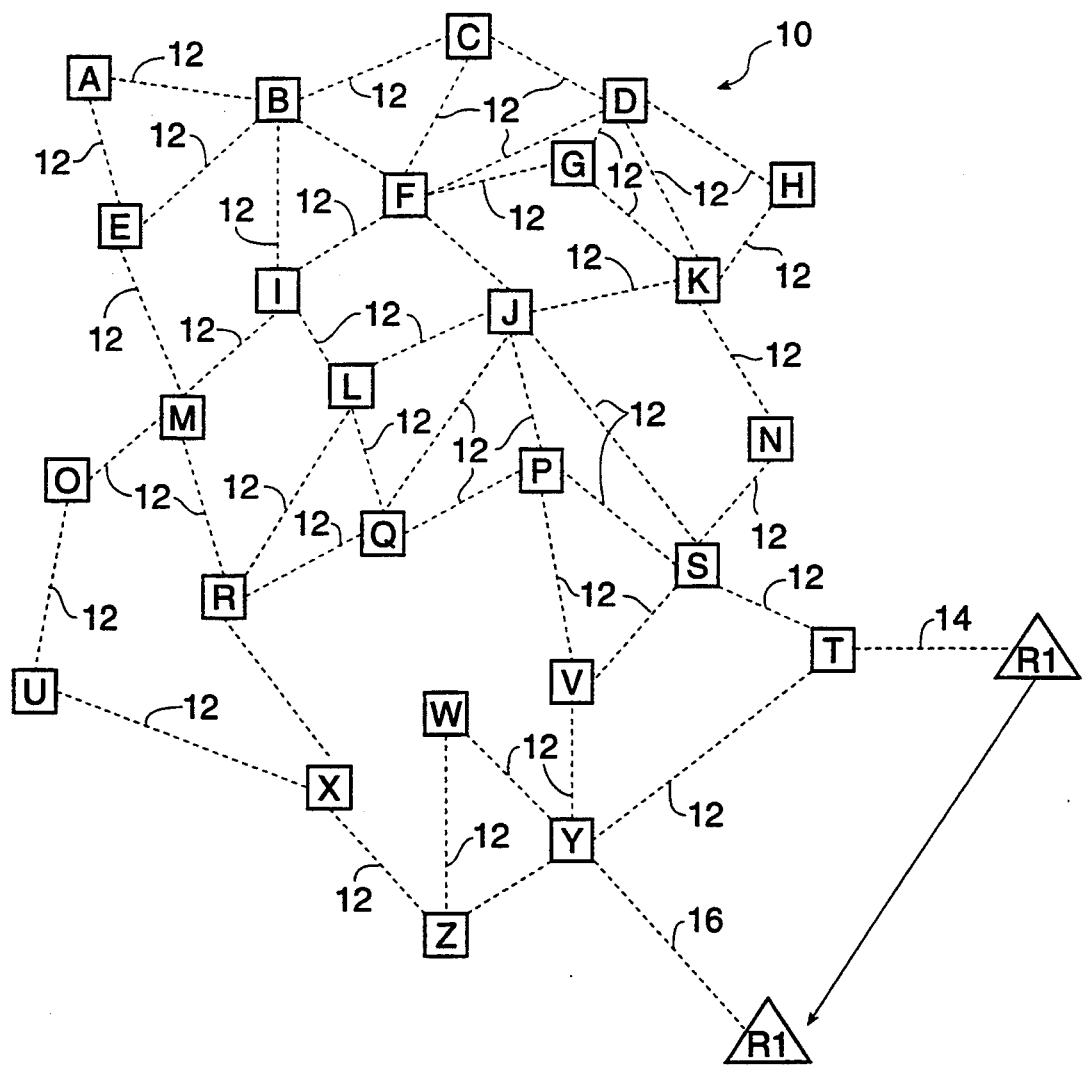
FIG. 1 is a block diagram illustrating a general data network topology with a roaming node according to the invention.

FIG. 1 shows a data network 10 in a topology in accordance with the patent to Baran and incorporating the present invention to allow for communication with roaming nodes. The network 10 consists of stationary nodes labelled A through Z interconnected by paths 12 representing allowable communication links between nodes and roaming node R1 connected to a parent node by a parasitic roaming communication link 14. Consider, for example, data arriving at a local node J with a destination of node Y. Routing to node Y would be most directly routed via node P and node V. Each node would consult its internal neighbor list and route data, in turn, to the next neighbor node on the path to destination Y.

Now consider data arriving or originating at local node H with a destination R1. Local node H will have obtained information about R1's most recent parent node by receiving a packet from R1 with a header containing that information. H will transmit data to the geographic address of that parent node, in this case T. That data will be routed from K to N to S to T. If R1 has continued to remain in transmitting distance from T, T will then transmit the packet to R1. However, R1 may have moved out of the range of node T and into the range of node Y since the last time H received a packet from R1. R1 will have established a new connection 16 with node Y. In this case, T will have stored the location of R1's next parent node in its local memory and will use that information to forward the packet for R1 to Y for delivery.

Figure 2:
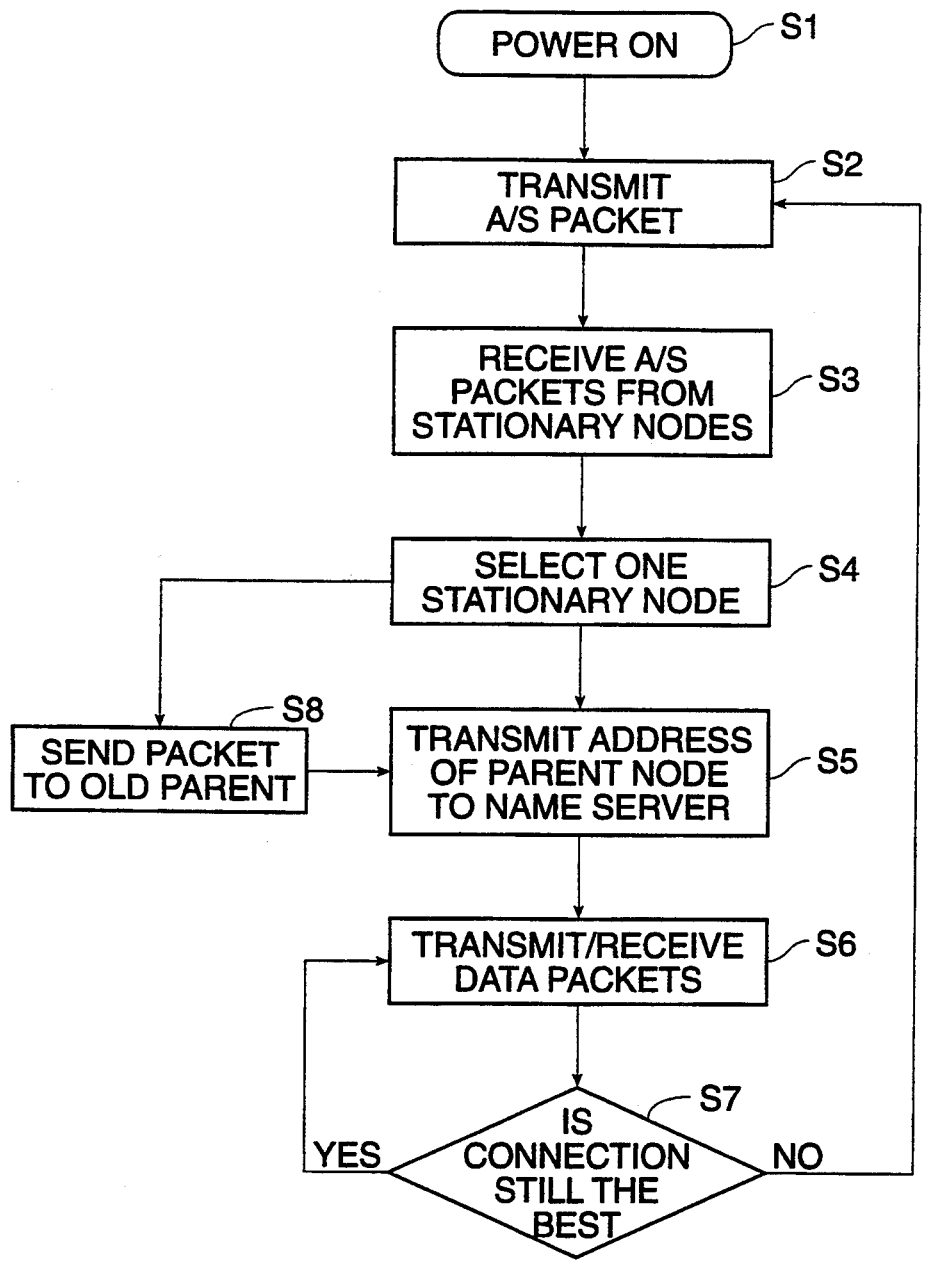
FIG. 2 is a flow chart describing the operation of a roaming node.

FIG. 2 depicts a flow chart illustrating the operation of a roaming node according to the invention. The process begins when the roaming node is turned on (Step S1). The roaming node then begins transmitting acquisition/synchronization packets on various network channels to any stationary nodes that can hear the transmission (Step S2). The roaming node then receives an acquisition/synchronization packet back from each stationary node that heard a packet (Step S3). The roaming node uses the information it received in these acquisition/synchronization packets and the signal strength of each packet to determine the stationary nodes to which it can most effectively communicate based on the power needed to reach that stationary and on the amount of empty capacity of that node. In one embodiment of the invention, the roaming node may receive from a stationary node an acquisition/synchronization packet containing not only information about that one stationary node but also information about other stationary nodes in the area with which the roaming node may be able to communicate. The roaming node may then use this information to transmit acquisition/synchronization packets to those other stationary nodes. Once the roaming node has received information about the stationary nodes in its area, the roaming node uses that information to select a parent node with the best communication link (Step S4). In one embodiment of the invention, the roaming node also stores information about other stationary nodes with which it can communicate and the roaming node transmits packets to the network through one of the alternate nodes if communication with the parent node is not possible. Once the communication link with the parent node is established, the roaming node in one embodiment transmits its current parent location to a name server node in the network (Step S5) and transmits and receives data to nodes in the network through the parent node (Step S6). In an embodiment of the invention with a name server, that name server can provide information regarding the location of any node in the network. The roaming node also continuously tests the received data packets and sends out additional acquisition/synchronization packets to determine the status of the roaming nodes ability to transmit to other stationary nodes in order to make a decision regarding whether the communication link with the current parent node is still the best link (Step S7). If the link with the current parent node is still the best link, the roaming node continues to transmit data through that parent (Step S6). If the link with the current parent node is not still the best link, the roaming node begins the process of selecting a new link again (Step S2). However, this time, once the new parent is selected, the roaming node sends a packet to the old parent informing the old parent that the old parent's link has been broken and telling the old parent the location of the new parent so that the old parent can forward data packets addressed to the roaming node to the new parent (Step S8). In an alternative embodiment, the name server may inform the old parent of the location of the current parent for forwarding purposes.

Figure 3:
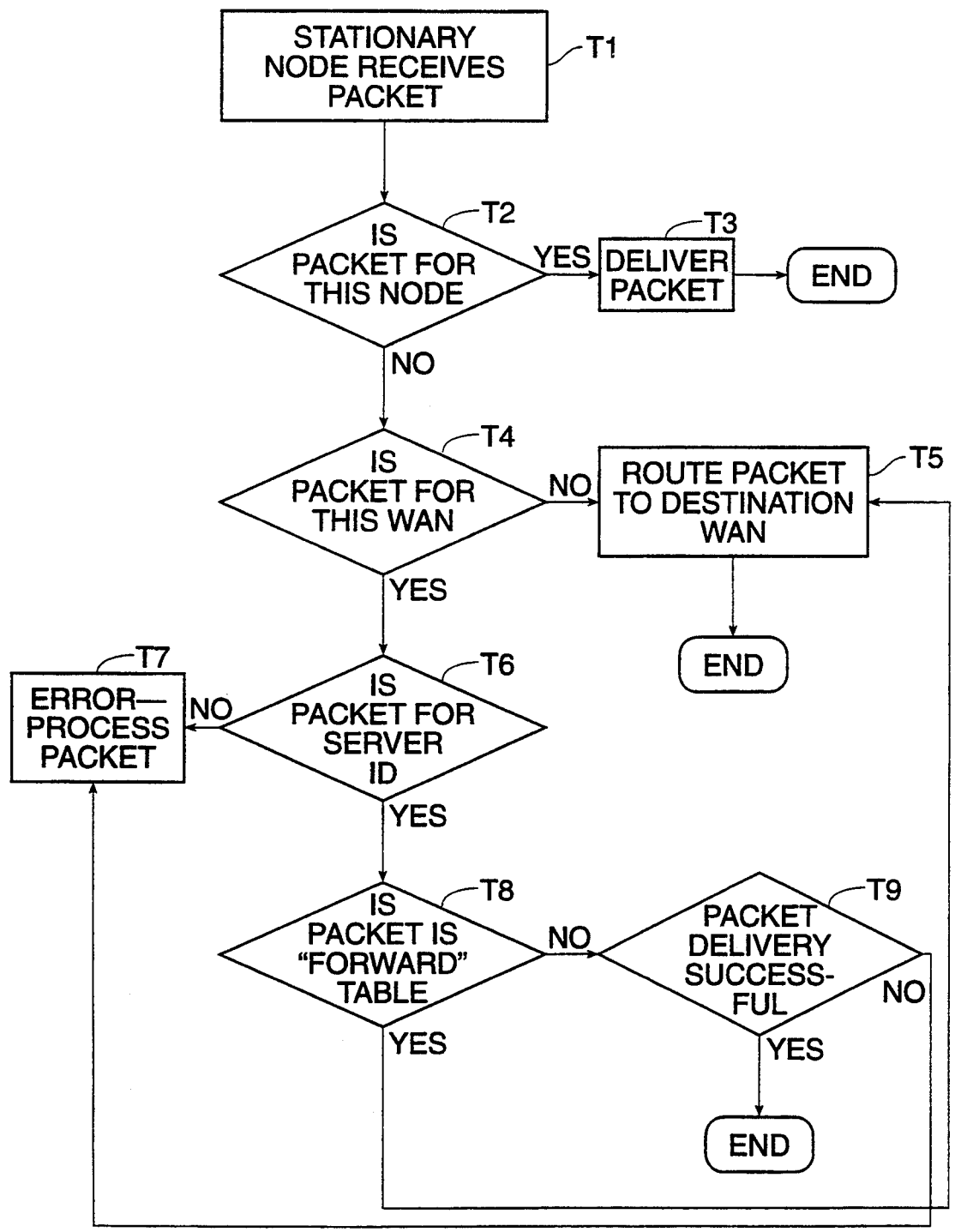
FIG. 3 is a flow chart describing the operation of a stationary node according to the invention.

FIG. 3 depicts a flow chart illustrating the operation of a stationary node according to the invention. The stationary node receives a packet (Step T1). The geographic location of the packet's destination is carried within the packet. The stationary node reads this information and determines if the packet is addressed to the stationary node or to a device that is directly connected to the stationary node (Step T2). If the packet is addressed to the stationary node or to a device that directly connected to it, the stationary node delivers the packet and processing of that packet is terminated (Step T3). If the packet is not addressed directly to the stationary node, the stationary node determines if the packet is addressed to a device within its wide area network (WAN)(Step T4). If the packet is not addressed to a device within the WAN of the stationary node, the packet is forwarded to the next node in the direction of the destination node's coordinate location (Step T5).

If the packet is addressed to the current stationary node's WAN, the stationary node determines if the packet is addressed to a device or roaming node which it serves (Step T6). If the packet is not addressed to a device or roaming node which the stationary node serves, an error has occurred and the stationary node process the packet according to its error-handling instructions (Step T7). In one embodiment, the stationary node processes a packet error by asking the name server for an address for the ultimate destination of the packet. The stationary node then routes the packet to the address provided by the name server. In another embodiment, the stationary node processes a packet error by discarding the packet and sending a message to the source of the packet that delivery was not successful.

If the packet is addressed to a device or roaming node which the stationary node serves, the stationary node determines if the address is for a roaming node listed in the stationary node's "forward" table (Step T8). If the destination is not listed in the stationary node's "forward" table, the stationary node will attempt to deliver the packet to the destination roaming node (Step T9). If delivery is successful, packet processing ends. If delivery is not successful, the stationary node processes the packet as an error (Step T7). If the destination is listed in the stationary node's "forward" table, the stationary node will forward the packet to the WAN listed in the forward table (Step T5).

In a specific embodiment of the invention discussed in detail in the Baran patent, the identifier for the roaming node is transmitted through the network as part of the Layer 3 header.

The invention has now been explained with reference to specific embodiments. Other embodiments will be apparent to those of ordinary skill in the art. It is therefore not intended that this invention be limited except as indicated by the appended claims.

What is claimed is:

1. In a packet communication network with a plurality of stationary nodes, a method by which a roaming node may establish a communication link with said network comprising the steps of:

transmitting a link acquisition packet to one or more of said stationary nodes;

receiving a response packet from each of said stationary nodes that successfully receives said link acquisition packet;

determining from data in said received response packets the one of said stationary nodes that provides the best communication link;

selecting the one of said stationary nodes that provides the best communication link by transmitting to said selected stationary node a packet informing said selected stationary node that said selected stationary node is a current parent node for said roaming node; and transmitting data packets to nodes in the network using an identifier of said parent node as part of the return identifier for said roaming node.

2. The method according to claim 1, further permitting said roaming node to change its network communication link to a new parent node in response to changed conditions and further including the steps of:

monitoring each received data packet from said current parent node to determine whether said communication link is still good;

intermittently transmitting link acquisition packets to one or more of said stationary nodes to determine the quality of the possible communication link with them;

receiving a response packet from each of said stationary nodes that successfully receives said link acquisition packet;

selecting from said received response packets one of said stationary nodes to be a new parent node when the link with said current parent node is no longer good;

transmitting to said current parent node a packet informing said current parent node that said current parent node is no longer the current parent node and that said new parent node is a current parent node for said roaming node; and transmitting to said new parent node a packet informing said new parent node that said new parent node is a current parent node for said roaming node.

3. A method for transmitting packet data between a plurality of stationary nodes and at least one roaming node comprising the steps of:

assigning a unique stationary node identifier to each stationary node;

assigning a unique roaming node identifier to said roaming node;

providing communication means between individual stationary nodes forming a network such that each stationary node can communicate directly with at least one other stationary node and such that any stationary node can communicate with any other stationary node by relaying data through any number of stationary nodes and identifying said data with said unique stationary node identifier for the receiving stationary node;

receiving at any number of stationary nodes a link acquisition packet from said roaming node and transmitting a response packet to said roaming node from each stationary node that received said link acquisition packet;

receiving from said roaming node a packet designating a single stationary node as the current parent node for that roaming node;

receiving at said parent node from said roaming node data packets which include said unique stationary node identifier for said parent node as part of the source address and transmitting said packets to other stationary nodes;

accepting at said parent node from any of said plurality of stationary nodes data packets for said roaming node;

transmitting said data packets to said roaming node from said parent node.

4. The method according to claim 3, further comprising the steps of:

receiving at said parent node from said roaming node a packet designating said parent node as an old parent node and informing said parent node of the identifier of a new parent node;

accepting at said old parent node data packets for said roaming node addressed to said old parent node;

forwarding said data packets to said new parent node for delivery to said roaming node.

5. The method according to claim 3, further comprising the steps of:

periodically receiving at a name server packets from said roaming node indicating the unique identifier of the current parent node and storing that information;

transmitting from said name server to any of said nodes in said network said identifier of said current parent node for said roaming node in response to a query from any of said nodes.

6. The method according to claim 5, further comprising the steps of:

receiving at said parent node from said name server a packet designating said parent node as an old parent node and informing said parent node of the identifier of a new parent node;

accepting at said old parent node data packets for said roaming node addressed to said old parent node;

forwarding said data packets to said new parent node for delivery to said roaming node.

* * * * *